(12) United States Patent    (10) Patent No.: US 7,459,874 B2
Bae et al.    (45) Date of Patent: Dec. 2, 2008

(54) SYSTEM AND METHOD FOR CONTROLLING ELECTRIC DRIVE SYSTEMS

(75) Inventors: Bon-Ho Bae, Torrance, CA (US); Steven E. Schulz, Torrance, CA (US); Nitinkumar R. Patel, Cypress, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 103 days.

(21) Appl. No.: 11/676,539

(22) Filed: Feb. 20, 2007

(65) Prior Publication Data

US 2008/0197796 A1    Aug. 21, 2008

(51) Int. Cl.
*G05B 5/01* (2006.01)

(52) U.S. Cl. ........................ 318/623; 318/609; 318/802; 318/807

(58) Field of Classification Search ................. 318/623, 318/609, 807, 702, 432, 701, 799, 721, 400.34, 318/610, 798, 804, 779
See application file for complete search history.

(56) References Cited

U.S. PATENT DOCUMENTS

2006/0119306 A1*    6/2006    Hampo et al. ............... 318/623

* cited by examiner

*Primary Examiner*—Karen Masih

(57) ABSTRACT

Methods, apparatus, and systems are provided for regulating the operation of a drive system within a battery voltage and power range. The apparatus includes a PI regulator producing a signal for regulating a torque output of the drive system based on a DC voltage source limit and/or power limit, a converter normalizing the signal from the PI regulator to produce a new torque limit, and a switch selecting either the new torque limit or an available torque limit of the drive system. The PI regulator includes an integrator having an initial value based on the torque output of the drive system and a copper loss term.

20 Claims, 6 Drawing Sheets

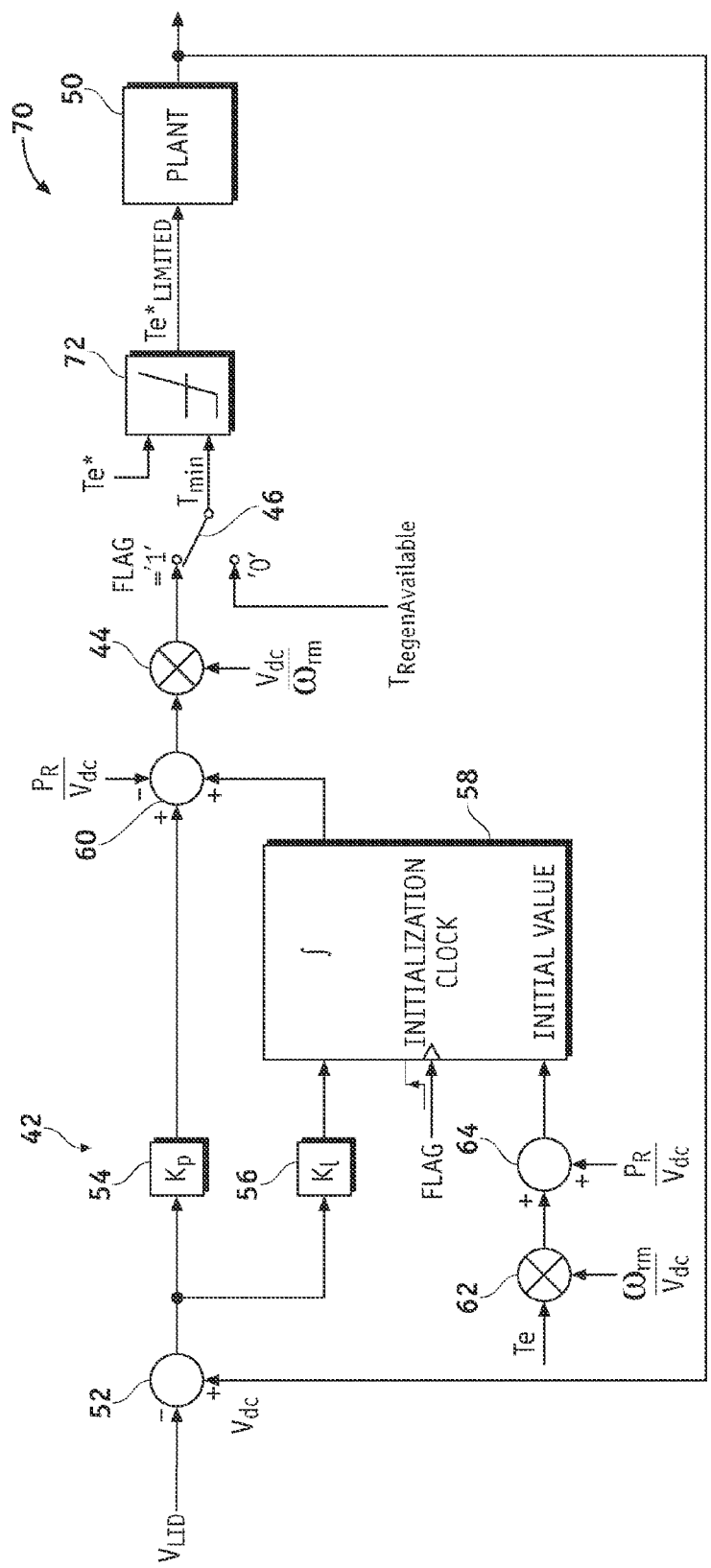
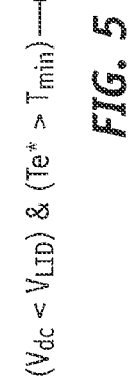
FIG. 4
FIG. 3
FIG. 5

SYSTEM AND METHOD FOR CONTROLLING ELECTRIC DRIVE SYSTEMS

FIELD

The present invention generally relates to controlling vehicle systems, and more particularly relates to systems and methods for controlling electric drive systems.

BACKGROUND OF THE INVENTION

In electric vehicle (EV)/fuel cell electric vehicle (FCEV)/hybrid electric vehicle (HEV) propulsion applications, one concern is with maintaining the vehicle battery within a predetermined range of operating voltage and power. When the battery operates beyond the predetermined range, this operation may lead to a reduced life span of the battery or otherwise negatively impact the performance of the battery. A number of different vehicle systems and functions draw current and power from the battery. For example, during motoring, the traction system typically draws current and power from the battery. In the event the traction system draws too much current, the battery voltage may drop below a minimum operating voltage of the battery.

One method of maintaining the battery within the predetermined operating range is to limit torque in the traction system. For example, during motoring, the motoring torque may be limited to keep the battery voltage above the minimum operating voltage. In another example, during a regenerating operation of the battery, the regenerating torque may be limited to keep the battery voltage below a maximum value. Open-loop torque limit tables, based on the modeling of the battery, may be used to limit torque. Because the battery model may significantly vary with respect temperature, state of charge, battery lifetime, and the like, these torque limit tables typically include margins to sufficiently account for the greatest variations which may decrease optimal operation.

Accordingly, it is desirable to provide a system for more optimally controlling electric traction drive systems. Additionally, it is desirable to provide a method for more optimally controlling electric traction drive systems. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods, apparatus, and systems are provided for controlling a drive system of a vehicle by regulating a torque output produced by the drive system. The drive system has a first torque limit and is at least partially powered by a direct current (DC) voltage source having a voltage limit and a power limit. In an exemplary embodiment, a controller is provided comprising a proportional integral (PI) regulator configured to produce a signal for regulating the torque output based on at least one of the voltage limit and the power limit, a converter having an input coupled to the PI regulator and having an output, a switch coupled to the PI current regulator and configured to select a torque limit from the first and second torque limits. The PI regulator comprises an integrator having an initial value based on the torque output and a loss term. The converter is configured to normalize the signal from the PI regulator to produce a second torque limit.

In another exemplary embodiment, a method for regulating a torque output of a drive system is provided. The drive system has a link voltage and is at least partially powered by a DC voltage source having a voltage range, a source power, and a power range. The method comprises the steps of generating the torque output in response to a torque command, determining if the link voltage exceeds the voltage range, selecting a first torque limit when the link voltage exceeds the voltage range, determining if the source power exceeds a power range, and selecting a second torque limit when the source power exceeds the power range. The first torque limit is based on the torque output and a first loss term, and the second torque limit is based on the torque output and a second loss term.

A control system for regulating a torque output produced by a drive system is provided. The drive system has a link voltage and is at least partially powered by a DC voltage source having a voltage range, a source power, and a power range. The control system comprises a first controller configured to produce a torque command, a second controller coupled to the first controller. The second controller is configured to monitor the link voltage and the source power, regulate the torque command to maintain the link voltage within the voltage range based on the torque output and a first loss term, and regulate the torque command to maintain the source power within the power range based on the torque output and a second loss term.

DESCRIPTION OF THE DRAWINGS

The present invention will hereinafter be described in conjunction with the following drawing figures, wherein like numerals denote like elements.

FIG. 3 is a block diagram of a logic latch useful in explaining the operation of the controller shown in FIG. 2;

FIG. 4 is a block diagram of a maximum voltage controller in accordance with another exemplary embodiment of the present invention;

FIG. 5 is a block diagram of a logic latch useful in explaining the operation of the controller shown in FIG. 4;

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention provides a control system, a controller, and a method for regulating, via a closed-loop, a torque output of an electric drive system (e.g., a traction drive system). The torque output is regulated to maintain a voltage and/or a power of a DC voltage source (e.g., a battery) within predetermined operating voltage and power ranges, such as may be specified for life span preservation and performance of the DC voltage source. The voltage and power ranges may also be specified in accordance with a variety of other drive system considerations.

In one exemplary embodiment, the electric drive system includes, but is not necessarily limited to, a motor (e.g., a permanent magnet motor (PMM)) that is powered in whole or in part by a DC voltage source. The motor operates in a powering or motoring operation mode and a regenerating operation mode, although the motor may operate in other modes. The voltage range of the DC voltage source may be specified between a minimum voltage of the powering operation of the motor and a maximum voltage of the regenerating operation of the motor. The power range may be specified between a maximum power of the powering operation of the motor and a minimum power of the regenerating operation of the motor.

To regulate the torque output of the electric drive system, the controller monitors a DC link voltage, adjusts the maximum torque limit during the powering operation, and adjusts the minimum torque limit during the regenerating operation to maintain the voltage of the DC voltage source within the voltage range. The controller also monitors the power of the DC voltage source, adjusts the maximum torque limit during the powering operation, and adjusts the minimum torque limit during the regenerating operation to maintain the power of the DC voltage source within the power range. For a substantially seamless activation/deactivation of the controller (e.g., to prevent torque jerk), the controller includes an integrator that is initialized at a predetermined value. Additionally, the adjusted torque limit may account for a voltage drop and a copper loss of the stator if the voltage drop and copper loss are significant. Using a closed-loop control, the operation of the electric drive system is optimized.

Figure 1:
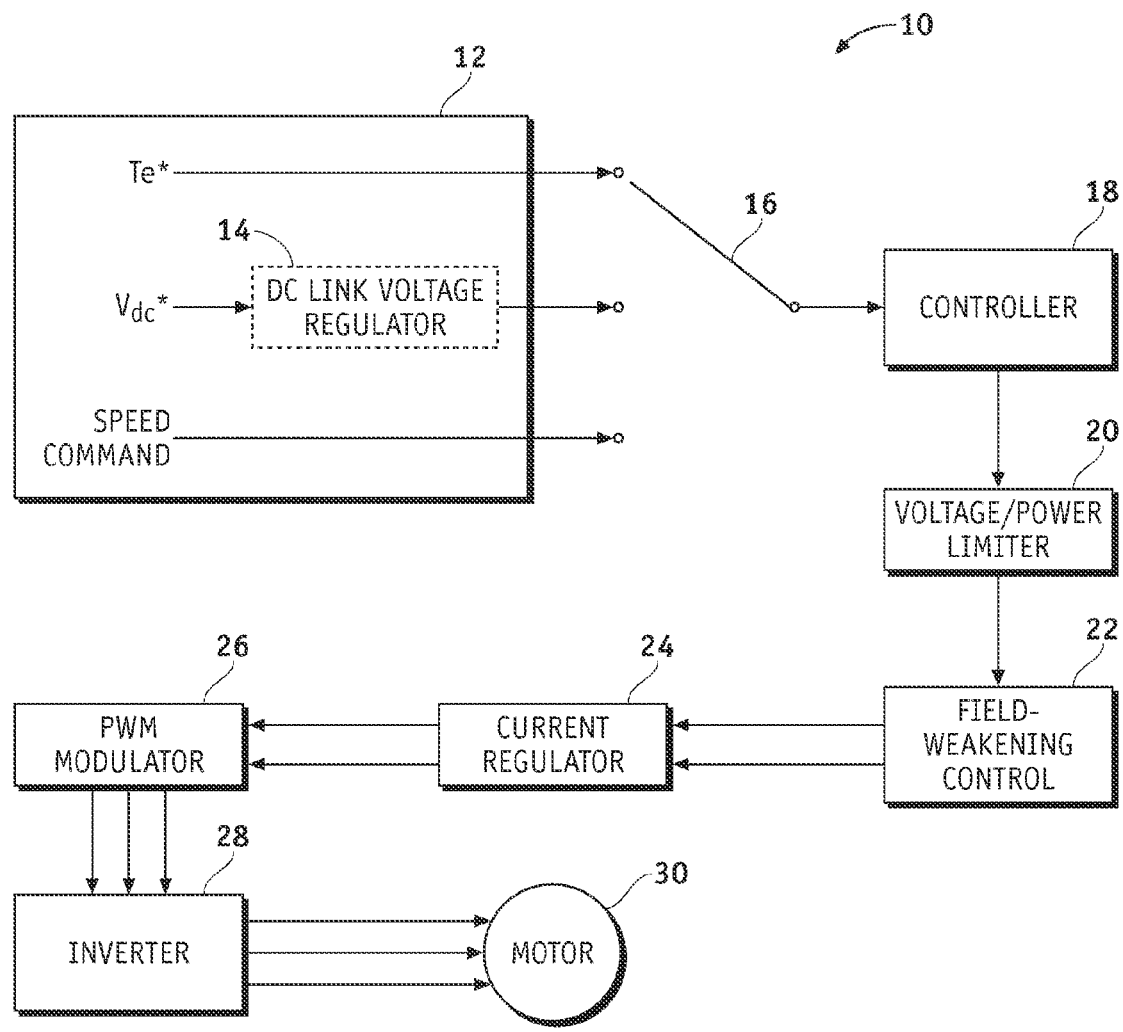
FIG. 1 is a block diagram of an electric drive system in accordance with an exemplary embodiment of the present invention.

Referring to FIG. 1, an electric drive system 10 is shown in accordance with an exemplary embodiment of the present invention. The electric drive system 10 comprises a high level controller 12 (e.g., a speed controller, a voltage controller, a torque reference generator, or the like) that produces a torque command (Te*), a switch 16 that selects a mode of operation and receives the torque command from the high level controller 12 based on the selected mode of operation, a voltage/power limiter 20 having an input coupled to an output of the switch 16, a field-weakening control 22 having an input coupled to the output of the voltage/power limiter 20, a current regulator 24 having an input coupled to an output of the field-weakening control 22, a pulse width modulation (PWM) modulator 26 having an input coupled to an output of the current regulator 24, an inverter 28 having an input coupled to an output of the PWM modulator 26, and a motor (e.g., a PMM) 30 coupled to an output of the inverter 28. The motor 30 is at least partially powered by a DC voltage source (not shown). In the voltage controller configuration, the high level controller 12 may include a DC link voltage regulator 14.

Although the controller 18 and voltage/power limiter 20 are each described as a unit, the controller 18 may comprise multiple control units and the voltage/power limiter 20 may comprise multiple limiter units that are each coupled to a corresponding control unit. For example, the controller 18 may comprise a minimum voltage controller, a maximum voltage controller, a maximum discharge power controller, and a maximum charge power controller, and the voltage/power limiter 20 may comprise a minimum voltage limiter, a maximum voltage limiter, a maximum discharge power limiter, and a maximum charge power limiter respectively coupled to the corresponding controller. Additionally, the electric drive system 10 may have a variety of configurations. For example, field-weakening control 22 may be omitted or replaced with different control methodologies for reducing back electromotive force (EMF) that may be generated during operation of the motor 30. One or more of the components of the control system 10 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components, or a combination thereof.

In an exemplary embodiment, the controller 18 and voltage/power limiter 20 operate together to limit, if necessary, the torque command produced by the high level controller 12. The controller 18 monitors a DC link voltage (e.g., a DC bus voltage) associated with the DC voltage source and adjusts the torque limit to maintain the DC link voltage within the predetermined operating voltage range of the DC voltage source. The controller 18 also monitors the power associated with the DC voltage source and adjusts the torque limit to maintain the power of the DC voltage source within the predetermined operating power range of the DC voltage source. The adjusted torque limit is supplied to the voltage/power limiter 20.

Based on the operation of the drive system 10 (e.g., powering operation or regenerating operation) and the monitored DC link voltage and/or power of the DC voltage source, a torque limit is selected for the voltage/power limiter 20 from the adjusted torque limit supplied by the controller 18 and from available torques of the motor 30 (e.g., an available motoring torque and an available regenerating torque). Using the selected torque limit, the voltage/power limiter 20 produces a limited torque command from the torque command produced by the high level controller 12.

The field-weakening control 22 produces synchronous reference frame current commands (e.g., $i^{*}_{ds}$, $i^{*}_{qs}$) from the limited torque command. The current regulator 24 produces voltage outputs from the synchronous reference frame current commands, and the PWM modulator 26 produces duty cycle commands (e.g., for each of the three phases) from these voltage outputs. The inverter 28 receives the duty cycle commands and produces three-phase voltages (e.g., $V_a$, $V_b$, $V_c$) from a supply potential (e.g., a battery potential or DC bus voltage ($V_{dc}$)) using the duty cycle commands and drives the motor 30 with the three-phase voltages.

Figure 2:
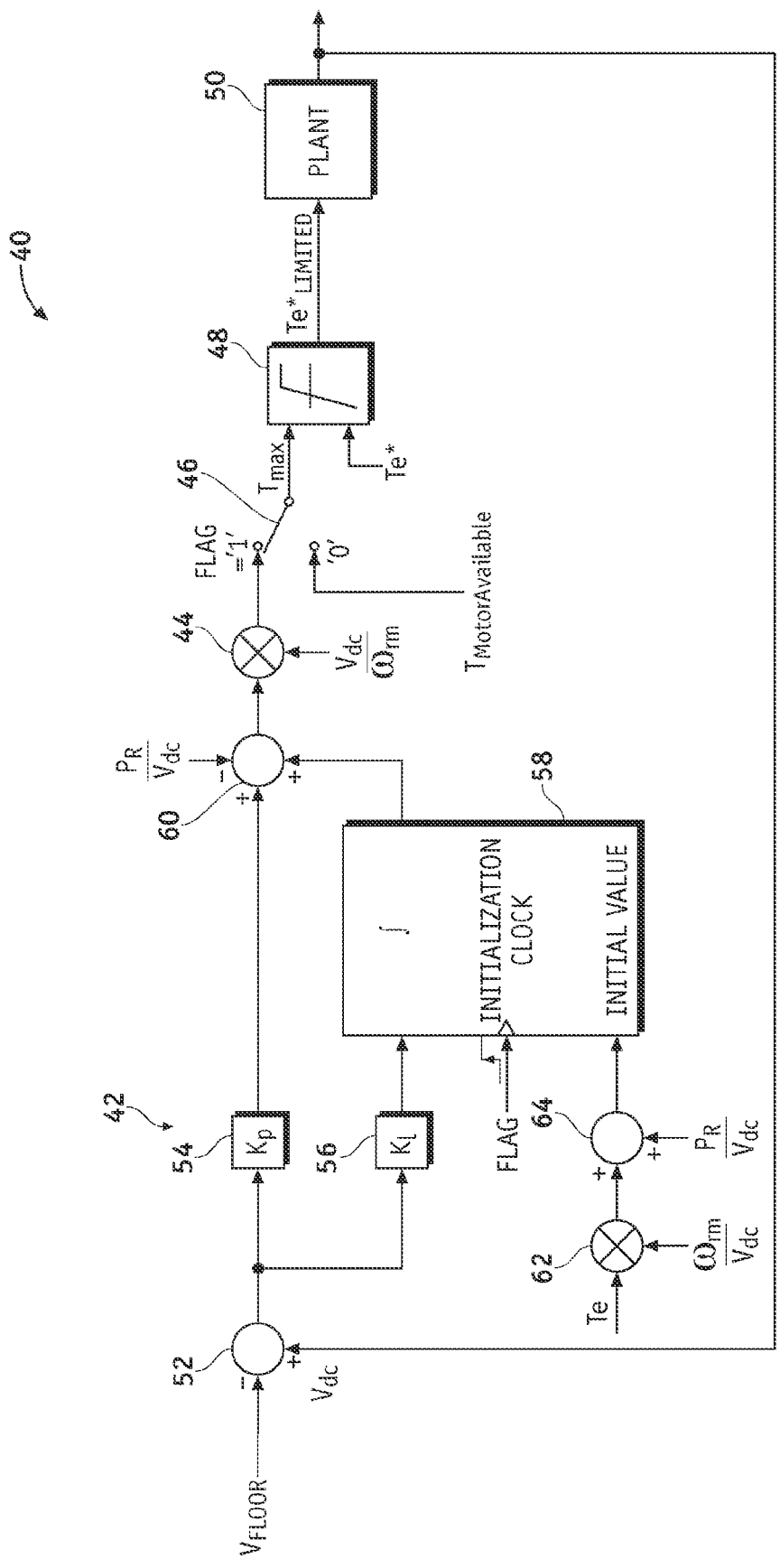
FIG. 2 is a block diagram of a minimum voltage controller in accordance with an exemplary embodiment of the present invention.

FIG. 2 is a block diagram of a minimum voltage controller 40 in accordance with an exemplary embodiment of the present invention. To prevent the DC link voltage from dropping below a minimum voltage ($V_{FLOOR}$), the motoring torque command (Te*) is limited by the controller 40 to a maximum torque ($T_{max}$). The controller 40 comprises a proportional integral (PI) regulator 42, a converter 44 having an input coupled to an output of the PI regulator 42 and having an output, a switch 46 for selecting a torque limit from the output of the converter 44 or an available motoring torque ($T_{MotorAvailable}$), and a limiter 48 having an input coupled to an output of the switch 46. The limiter 48 receives the torque command (Te*) (e.g., from the high level controller 12) and produces a limited torque command (Te*$_{Limited}$) using the maximum torque ($T_{max}$). A plant (e.g., a combination of the inverter 28, motor 30, and a DC voltage source) 50 is coupled to an output of the limiter 48 to receive the limited torque command and produce the DC link voltage ($V_{DC}$) in response to the limited torque command.

In this exemplary embodiment, the PI regulator 42 receives an error based on a difference (e.g., via a summer 52) between the DC link voltage ($V_{DC}$) and the minimum voltage ($V_{FLOOR}$), and thus the controller 40 is closed-loop. The PI regulator 42 comprises a first processing module 54, a second processing module 56, and an integrator 58 coupled to an output of the second processing module 56. The first processing module 54 applies a proportional gain ($K_P$) to the error to produce a proportional term. The second processing module 56 and integrator 58 apply an integral gain ($K_I$) and an integral function, respectively, to the error to produce an integral term.

The proportional gain ($K_P$) and integral gain ($K_I$) may be derived or selected based on the DC link voltage. Referring to FIGS. 1 and 2, because the closed-loop controller 40 is based on the DC link voltage regulator 14, the proportional gain ($K_P$) and integral gain ($K_I$) may be derived from the DC link voltage regulator 14. For ease of analysis, the actual output torque is assumed to be the same as the reference torque because the dynamics of the current regulator 24 is substantially faster than that of the DC link voltage regulator 14. Additionally, the loss in the inverter 28 and motor 30 is assumed to be negligible and all the electric power is consumed to generate the mechanical power. For a simple analysis, with the DC voltage source modeled as a series RC model, $$K_I = \omega_{bw}/R_e \text{ and}$$

$$K_I/K_P >> \omega_{bw},$$

where $R_e$ represents the equivalent resistance of the DC voltage source and $\omega_{bw}$ represents a voltage regulation bandwidth.

If the DC link voltage drops below the minimum voltage ($V_{FLOOR}$), the integrator 58 is initialized (e.g., via a flag) to an initial value derived from a torque output (e.g., produced by the plant 50) and, optionally, a loss term associated with the stator. The torque output is converted to a DC current by multiplying with $\omega_{rm}/V_{DC}$ and adding a loss term ($P_R/V_{DC}$), where $P_R$ represents a stator copper loss of the motor 30 and where $\omega_{rm}$ represents a rotor speed of the stator of the motor 30. The proportional and integral terms are summed via a summer 60 to produce a DC current. In one exemplary embodiment, the summer 60 also removes the loss term ($P_R/V_{DC}$) from the sum of the proportional and integral terms. The converter 44 converts the DC current to a torque by multiplying the DC current from the summer 60 with $V_{DC}/\omega_{rm}$.

If the DC link voltage drops below the minimum voltage ($V_{FLOOR}$), the switch 46 couples to the output of the converter 44 and the torque produced by the converter 44 is selected as the maximum torque ($T_{max}$) of the limiter 48. If the DC link voltage is greater than the minimum voltage ($V_{FLOOR}$) and the torque command is less than the maximum torque ($T_{max}$), the available motoring torque ($T_{MotorAvailable}$) is selected as the torque limit of the limiter 48.

FIG. 3 is block diagram of a logic latch 66 useful in explaining the operation of the controller 40 shown in FIG. 2. The latch 66 is a set/reset logic latch that provides a flag signal to the integrator 58 and the switch 46. If the DC link voltage drops below the minimum voltage ($V_{FLOOR}$), the latch 66 sets the flag to a logic "1." When the flag is a logic "1," the switch 46 couples to the output of the converter 44 and the torque produced by the converter 44 is selected as the torque limit of the limiter 48. If the DC link voltage is greater than the minimum voltage ($V_{FLOOR}$) and the torque command is less than the maximum torque ($T_{max}$), the flag is reset to a logic "0." When the flag is a logic "0," the available motoring torque ($T_{MotorAvailable}$) is selected as the torque limit of the limiter 48.

FIG. 4 is a block diagram of a maximum voltage controller 70 in accordance with an exemplary embodiment of the present invention. To prevent the DC link voltage from rising above a maximum voltage ($V_{LID}$), the regenerating torque command (Te*) is limited by the controller 70 to a minimum torque ($T_{min}$). The controller 70 comprises similar components as the controller 40 (shown in FIG. 2) with a maximum voltage limiter 72 replacing the minimum voltage limiter 48 (shown in FIG. 2). In this exemplary embodiment, the switch 46 is configured to select a torque limit from the output of the converter 44 or an available regenerating torque ($T_{RegenAvailable}$). The limiter 72 receives the torque command (Te*) (e.g., from the high level controller 12) and produces a limited torque command (Te*$_{Limited}$) using the minimum torque ($T_{min}$).

In this exemplary embodiment, the PI regulator 42 receives an error based on a difference (e.g., via a summer 52) between the DC link voltage ($V_{DC}$) and the maximum voltage ($V_{LID}$), and thus the controller 70 is closed-loop. If the DC link voltage rises above the maximum voltage ($V_{LID}$), the integrator 58 is initialized (e.g., via a flag) to the initial value derived from a torque output (e.g., produced by the plant 50) and, optionally, the stator copper loss term ($P_R/V_{DC}$). Additionally, the switch 46 couples to the output of the converter 44 and the torque produced by the converter 44 is selected as the minimum torque limit of the limiter 72. If the DC link voltage is less than the maximum voltage ($V_{LID}$) and the torque command is greater than the minimum torque ($T_{min}$), the available regenerating torque ($T_{RegenAvailable}$) is selected as the torque limit of the limiter 72.

FIG. 5 is block diagram of a logic latch 76 useful in explaining the operation of the controller 70 shown in FIG. 4. The latch 76 is similar to the latch 66 (shown in FIG. 3). If the DC link voltage rises above the maximum voltage ($V_{LID}$), the latch 76 sets the flag to a logic "1." When the flag is a logic "1," the switch 46 couples to the output of the converter 44 and the torque produced by the converter 44 is selected as the torque limit of the limiter 72. If the DC link voltage is less than the maximum voltage ($V_{LID}$) and the torque command is greater than the minimum torque ($T_{min}$), the flag is reset to a logic "0." When the flag is a logic "0," the available regenerating torque ($T_{RegenAvailable}$) is selected as the torque limit of the limiter 72.

Figure 6:
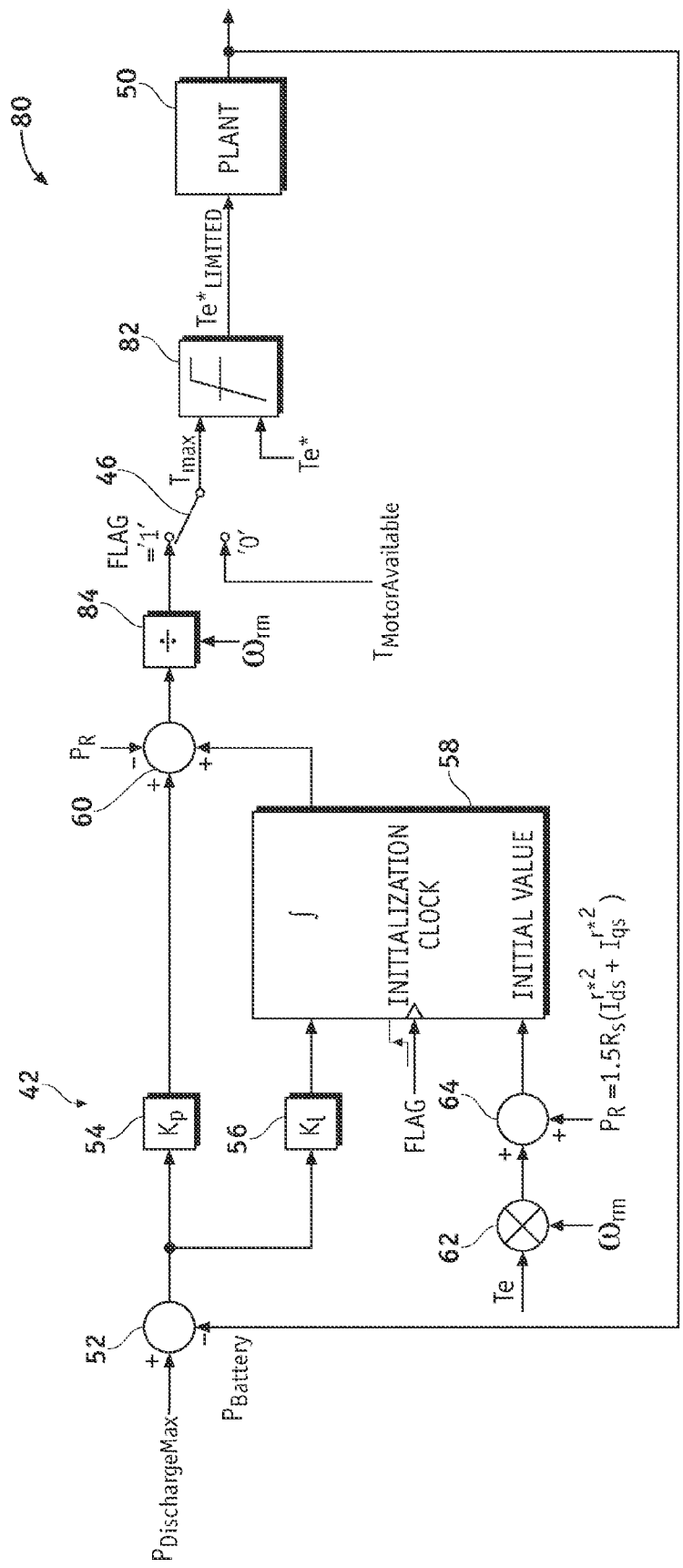
FIG. 6 is a block diagram of a maximum discharge power controller in accordance with another exemplary embodiment of the present invention.

FIG. 6 is a block diagram of a maximum discharge power controller 80 in accordance with an exemplary embodiment of the present invention. To prevent the power of the DC voltage source from rising above a maximum discharge power ($P_{DischargeMax}$), the motoring torque command (Te*) is limited by the controller 80 to a maximum torque ($T_{max}$). In some cases, the current of the DC voltage source may not be available. The power of the DC voltage source may be estimated from the electric power supplied to the motor 30 (shown in FIG. 1), assuming that the inverter loss is negligible. A current sensor (e.g., a battery current sensor) may be installed to measure the current and voltage of the DC voltage source for determining the power.

The controller 80 comprises similar components as the controller 40 (shown in FIG. 2) with a maximum power limiter 82 replacing the minimum voltage limiter 48 (shown in FIG. 2) and a divider 84 replacing the converter 44 (shown in FIG. 2). In this exemplary embodiment, the switch 46 is configured to select a torque limit from the output of the converter 44 or an available motoring torque ($T_{MotorAvailable}$). The limiter 82 receives the torque command (Te*) (e.g., from the high level controller 12) and produces a limited torque command (Te*$_{Limited}$) using the maximum torque ($T_{max}$).

In this exemplary embodiment, the PI regulator 42 receives an error based on a difference (e.g., via a summer 52) between the power of the DC voltage source ($P_{Battery}$) and the maximum discharge power ($P_{DischargeMax}$), and thus the controller 80 is closed-loop. Referring to FIGS. 1 and 6, the power of the DC voltage source is assumed to be the sum of the mechanical power of the motor 30 and the stator copper loss. The proportional gain ($K_P$) and integral gain ($K_I$) may be derived or selected as follows:

$$K_I = \omega_{bw}$$

$$K_P << K_I / \omega_{bw},$$

where $\omega_{bw}$ represents a power regulation bandwidth.

If the power of the DC voltage source rises above the maximum discharge power ($P_{DischargeMax}$), the integrator 58 is initialized (e.g., via a flag) to an initial value derived from a torque output (e.g., produced by the plant 50) and a stator copper loss term ($P_R$). In this exemplary embodiment, the stator copper loss term ($P_R$) is determined to be $1.5R_S(I^{*2}_{ds} + I^{*2}_{qs})$, where $R_S$ represents the stator resistance. The torque output is converted to a power value by multiplying with $\omega_{rm}$ and adding the loss term ($P_R$). The proportional and integral terms are summed via a summer 60 and the loss term ($P_R$) is removed from the sum of the proportional and integral terms. The divider 84 converts the output of the summer 60 to a torque by dividing the output of the summer 60 with $\omega_{rm}$.

If the power of the DC voltage source rises above the maximum discharge power ($P_{DischargeMax}$), the switch 46 couples to the output of the divider 84 and the torque produced by the divider 84 is selected as the maximum torque ($T_{max}$) of the limiter 82. If the power of DC voltage source is less than the maximum discharge power ($P_{DischargeMax}$) and the torque command is less than the maximum torque ($T_{max}$), the available motoring torque ($T_{MotorAvailable}$) is selected as the torque limit of the limiter 82.

Figure 7:
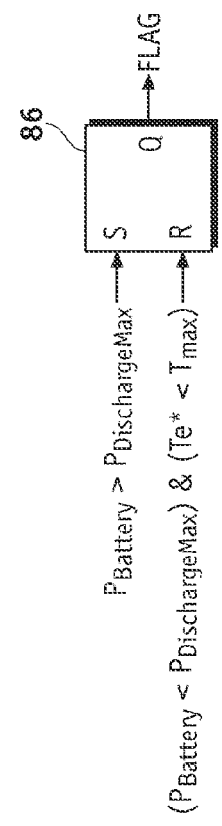
FIG. 7 is a block diagram of a logic latch useful in explaining the operation of the controller shown in FIG. 7.

FIG. 7 is block diagram of a logic latch 86 useful in explaining the operation of the controller 80 shown in FIG. 6. The latch 86 is similar to the latch 66 (shown in FIG. 3). If the power of the DC voltage source rises above the maximum discharge power ($P_{DischargeMax}$), the latch 86 sets the flag to a logic "1." When the flag is a logic "1," the switch 46 couples to the output of the divider 84 and the torque produced by the divider 84 is selected as the torque limit of the limiter 82. If the power of the DC voltage source is less than the maximum discharge power ($P_{DischargeMax}$) and the torque command is less than the maximum torque ($T_{max}$), the flag is reset to a logic "0." When the flag is a logic "0," the available motoring torque ($T_{MotorAvailable}$) is selected as the torque limit of the limiter 82.

Figure 8:
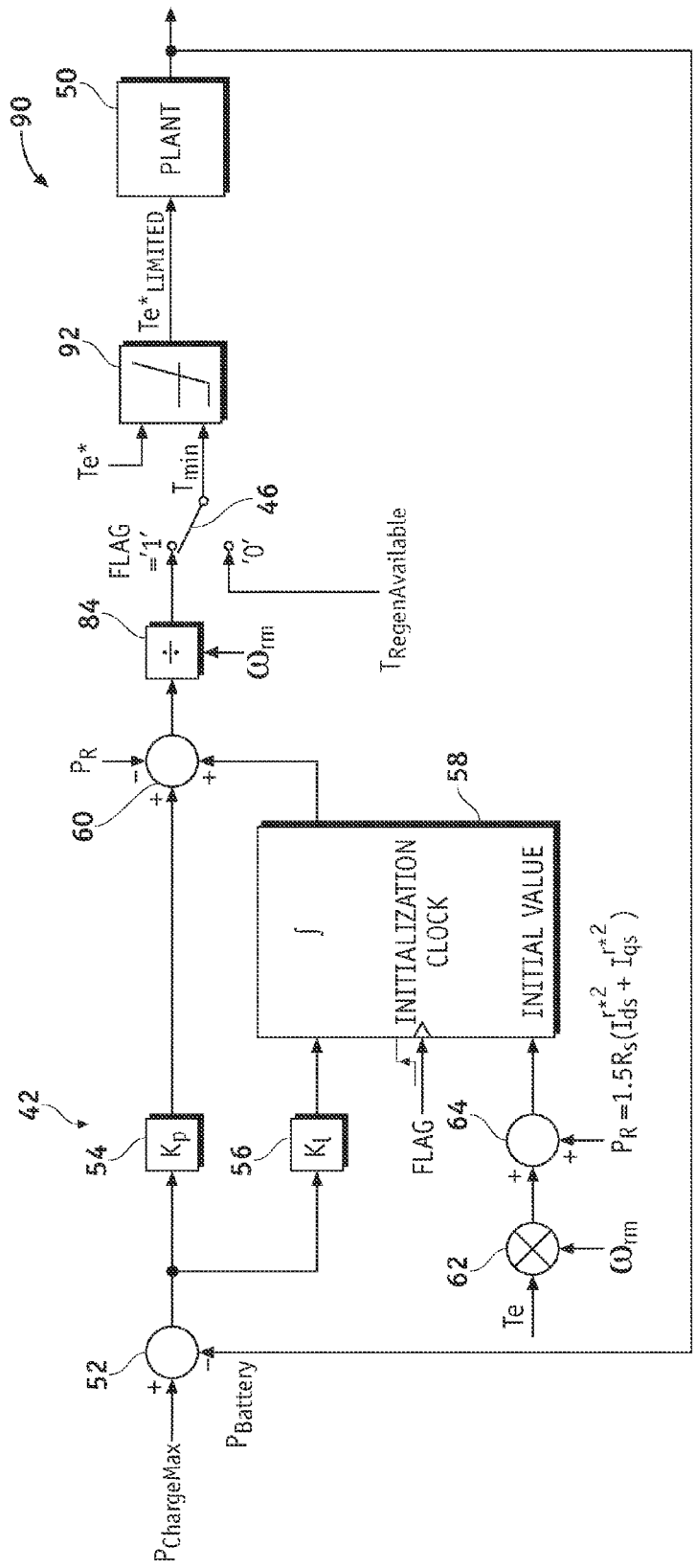
FIG. 8 is a block diagram of a maximum charge power controller in accordance with another exemplary embodiment of the present invention.

FIG. 8 is a block diagram of a maximum charge power controller 90 in accordance with an exemplary embodiment of the present invention. To prevent the power of the DC voltage source from dropping below a maximum charge power ($P_{ChargeMax}$), the regenerating torque command (Te*) is limited by the controller 90 to a minimum torque ($T_{min}$). The controller 90 comprises similar components as the controller 80 (shown in FIG. 6) with a minimum power limiter 92 replacing the maximum power limiter 82 (shown in FIG. 6). In this exemplary embodiment, the switch 46 is configured to select a torque limit from the output of the converter 44 or an available regenerating torque ($T_{RegenAvailable}$). The limiter 92 receives the torque command (Te*) (e.g., from the high level controller 12) and produces a limited torque command (Te*$_{Limited}$) using the minimum torque ($T_{min}$).

In this exemplary embodiment, the PI regulator 42 receives an error based on a difference (e.g., via a summer 52) between the power of the DC voltage source ($P_{Battery}$) and the maximum charge power ($P_{ChargeMax}$), and thus the controller 90 is closed-loop. If the power of the DC voltage source drops below the maximum charge power ($P_{ChargeMax}$), the integrator 58 is initialized (e.g., via a flag) to the initial value derived from a torque output (e.g., produced by the plant 50) and the stator copper loss term ($P_R$). If the power of the DC voltage source drops below the maximum charge power ($P_{ChargeMax}$), the switch 46 couples to the output of the divider 84 and the torque produced by the divider 84 is selected as the minimum torque ($T_{min}$) of the limiter 92. If the power of the DC voltage source is greater than the maximum charge power ($P_{ChargeMax}$) and the torque command is greater than the minimum torque ($T_{min}$), the available regenerating torque ($T_{RegenAvailable}$) is selected as the torque limit of the limiter 92.

Figure 9:
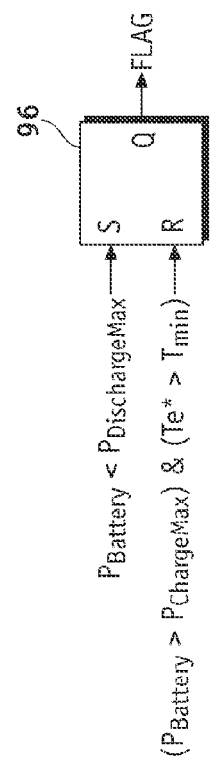
FIG. 9 is a block diagram of a logic latch useful in explaining the operation of the controller shown in FIG. 8.

FIG. 9 is block diagram of a logic latch 96 useful in explaining the operation of the controller 90 shown in FIG. 8. The latch 96 is similar to the latch 86 (shown in FIG. 3). If the power of the DC voltage source drops below the maximum charge power ($P_{ChargeMax}$), the latch 86 sets the flag to a logic "1." When the flag is a logic "1," the switch 46 couples to the output of the divider 84 and the torque produced by the divider 84 is selected as the torque limit of the limiter 92. If the power of the DC voltage source is greater than the maximum charge power ($P_{ChargeMax}$) and the torque command is greater than the minimum torque ($T_{min}$), the flag is reset to a logic "0." When the flag is a logic "0," the available regenerating torque ($T_{RegenAvailable}$) is selected as the torque limit of the limiter 92.

Figure 10:
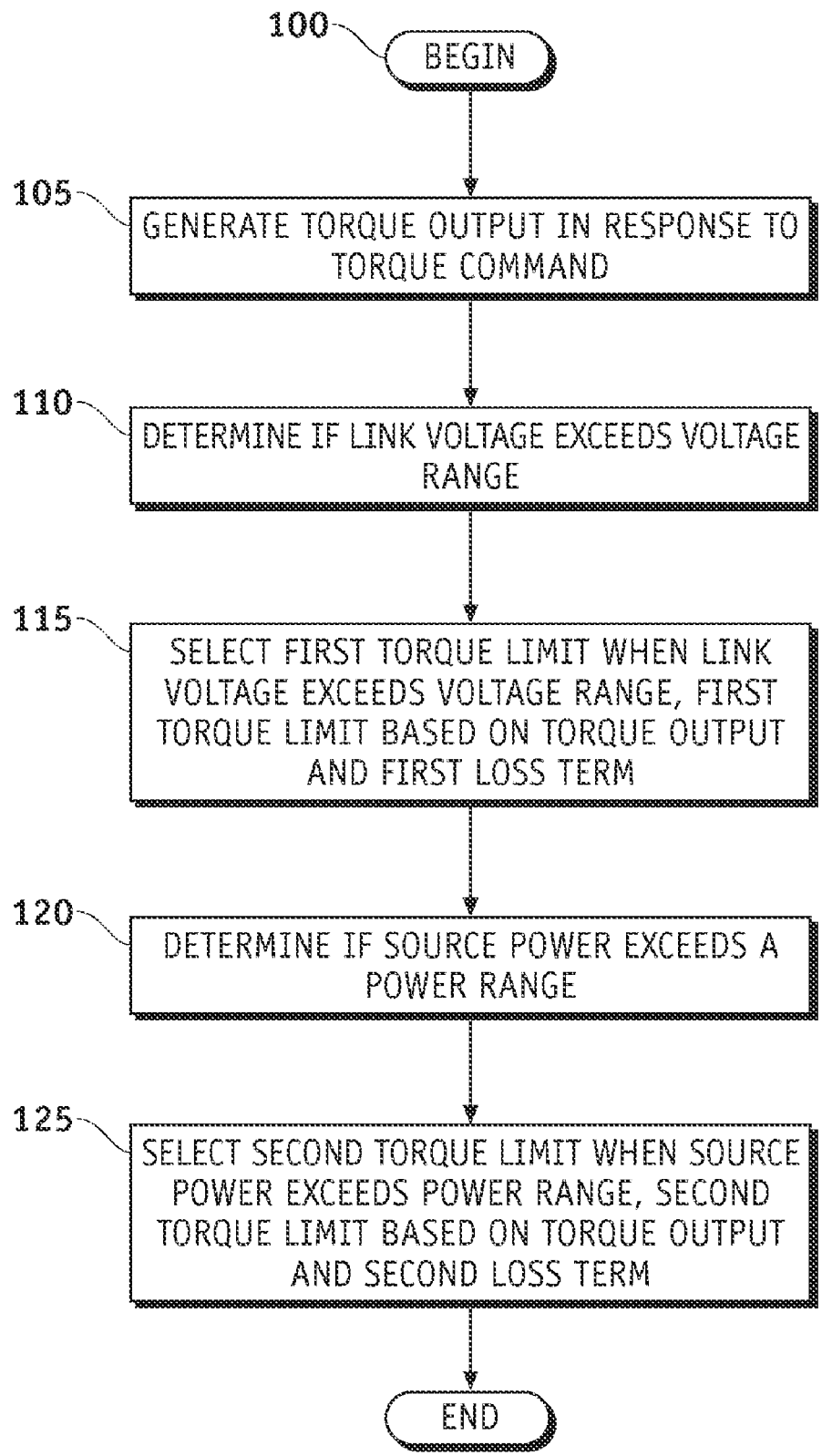
FIG. 10 is a flow diagram of a method for regulating a torque output of an electric drive system in accordance with an exemplary embodiment of the present invention.

FIG. 10 is a flow diagram of a method 100 for regulating a torque output of a drive system in accordance with an exemplary embodiment of the present invention. The drive system has a link voltage (e.g., the DC link voltage) and is at least partially powered by a DC voltage source (e.g., a battery) having a voltage range, a source power, and a power range. The torque output is generated in response to a torque command, as indicated at step 105. A determination is made as to the link voltage exceeding the voltage range, as indicated at step 110. A first torque limit is selected when the link voltage exceeds the voltage range, as indicated at step 115. The first torque limit is based on the torque output and a first loss term (e.g., $P_R/V_{DC}$).

In one exemplary embodiment, a determination is made if the link voltage is less than a minimum voltage (e.g., $V_{FLOOR}$). A further determination may be made for an error (e.g., a difference) between the link voltage and the minimum voltage. A proportional gain is applied to the error to produce a proportional term, and an integral gain and an integral function are applied to the error to produce an integral term. The integral function has an initial value based on the torque output of the drive system and the first loss term. The proportional term is summed with the integral term to produce a first current, the first loss term is removed from the first current to produce a second current, and the second current is converted to a torque to produce the first torque limit (e.g., $T_{max}$).

In another exemplary embodiment, a determination is made as to the link voltage being greater than a maximum voltage (e.g., $V_{LID}$). A further determination may be made for an error between the link voltage and the maximum voltage. A proportional gain is applied to the error to produce a proportional term, and an integral gain and an integral function are applied to the error to produce an integral term. The integral function has an initial value based on the torque output of the drive system and the first loss term. The proportional term is summed with the integral term to produce a first current, the first loss term is removed from the first current to produce a second current, and the second current is converted to a torque to produce the first torque limit (e.g., $T_{min}$).

A determination is made if the source power exceeds a power range, as indicated at step 120. A second torque limit is selected when the source power exceeds the power range, as indicated at step 125. The second torque limit is based on the torque output and a second loss term (e.g., $P_R = 1.5 R_S (T^{r*2}_{ds} + I^{r*2}_{qs})$). In one exemplary embodiment, a determination is made as to if the source power is greater than a maximum discharge power (e.g., $P_{DischargeMax}$). A further determination is made for an error between the source power and the maximum discharge power. A proportional gain is applied to the error to produce a proportional term, and an integral gain and an integral function are applied to the error to produce an integral term. The integral function has an initial value based on the torque output of the drive system and the second loss term. The proportional term is summed with the integral term to produce a first current, the second loss term is removed from the first current to produce a second current, and the second current is converted to a torque to produce the second torque limit (e.g., $T_{max}$).

In another exemplary embodiment, a determination is made as to if the source power is less than a maximum charge power (e.g., $P_{ChargeMax}$). A further determination may be made for an error between the source power and the maximum charge power. A proportional gain is applied to the error to produce a proportional term, and an integral gain and an integral function are applied to the error to produce an integral term. The integral function has an initial value based on the torque output of the drive system and the second loss term. The proportional term is summed with the integral term to produce a first current, the second loss term is removed from the first current to produce a second current, and the second current is converted to a torque to produce the second torque limit (e.g., $T_{min}$).

The drive system has a powering or motoring mode with a corresponding available motoring torque during the powering mode. Additionally, the drive system has a regenerating mode with a corresponding available regenerating torque during the regenerating mode. The available motoring torque (e.g., $T_{MotorAvailable}$) of the drive system is selected for the first torque limit (e.g., $T_{max}$) when the link voltage is greater than the minimum voltage (e.g., $V_{FLOOD}$), the torque command is less than the first torque limit (e.g., $T_{max}$), and the drive system is operating in the powering mode. The available regenerating torque (e.g., $T_{RegenAvailable}$) of the drive system is selected for the first torque limit when the link voltage is less than the maximum voltage (e.g., $V_{LID}$), the torque command is within the first torque limit (e.g., $T_{min}$), and the drive system is operating in the regenerating mode. The available motoring torque of the drive system is selected for the second torque limit (e.g., $T_{max}$) when the source power is less than the maximum power (e.g., $P_{DischargeMax}$), the torque command is less than the second torque limit, and the drive system is operating in the powering mode. The available regenerating torque of the drive system is selected for the second torque limit (e.g., $T_{min}$) when the source power is greater than the minimum power (e.g., $P_{ChargeMax}$), the torque command is within the second torque limit, and the drive system is operating in the regenerating mode.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A controller for regulating a torque output produced by an electric drive system, the electric drive system having a first torque limit, a voltage limit, and a power limit, the controller comprising:
   a proportional integral (PI) regulator configured to produce a signal for regulating the torque output based on at least one of the voltage limit and the power limit, said PI regulator comprising an integrator having an initial value based on the torque output and a loss term;
   a converter having an input coupled to said PI regulator and having an output, said converter configured to normalize said signal from said PI regulator to produce a second torque limit at said output; and
   a switch coupled to said PI current regulator and configured to select a torque limit from said first and second torque limits.

2. A controller according to claim 1, wherein the electric drive system comprises a battery having a battery voltage; and wherein said PI current regulator further comprises:
   a first module configured to apply a first gain to a first error to produce a proportional term, said first error based on a difference between the voltage limit and the battery voltage; and
   a second module configured to apply a second gain and an integral function to said first error to produce an integral term, said second module further configured to apply said integral function via said integrator;
   a summer having a first input coupled to said first module and a second input coupled to said second module, said summer configured to produce a first current from a sum of said proportional term and said integral term.

3. A controller according to claim 2, wherein said summer has an output coupled to said input of said converter and is further configured to subtract said loss term from said first current to produce a second current; and
   wherein said converter is further configured to produce said second torque limit from said second current.

4. A controller according to claim 1, wherein the electric drive system has a copper loss associated therewith, and wherein said loss term is based on said copper loss.

5. A controller according to claim 1, wherein the electric drive system is configured to produce the torque output in response to a torque command, the drive system comprising a battery having a battery voltage; wherein said voltage limit is a minimum battery voltage, said first torque limit is an available motor torque, and said second torque limit is a maximum torque; and wherein said switch is further configured to:
   select said second torque limit from said converter if the battery voltage is less than said minimum battery voltage; and
   select the first torque limit of the drive system if the battery voltage is greater than said minimum battery voltage and the torque command is less than said second torque limit.

6. A controller according to claim 1, wherein the electric drive system is configured to produce the torque output in response to a torque command, the drive system comprising a battery having a battery voltage; wherein said voltage limit is a maximum battery voltage, said first torque limit is an available regeneration torque, and said second torque limit is a minimum torque; and wherein said switch is further configured to:

select said second torque limit if the battery voltage is greater said maximum battery voltage; and select said first torque limit if the battery voltage is less than said maximum battery voltage and the torque command is greater than said minimum torque.

7. A controller according to claim 1, wherein the electric drive system is configured to produce the torque output in response to a torque command, the drive system comprising a battery having a battery power; wherein said power limit is a maximum discharge power, said first torque limit is an available motor torque, and said second torque limit is a maximum torque; and wherein said switch is further configured to:

select said second torque limit if the battery power is greater said maximum discharge power; and select said first torque limit if the battery power is less than said maximum discharge power and the torque command is less than said maximum torque.

8. A controller according to claim 1, wherein the electric drive system is configured to produce the torque output in response to a torque command, the drive system comprising a battery having a battery power; wherein said power limit is a maximum charge power, said first torque limit is an available regeneration torque, and said second torque limit is a minimum torque; and wherein said switch is further configured to:

select said second torque limit if the battery power is less said maximum charge power; and select said first torque limit if the battery power is greater than said maximum charge power and the torque command is greater than said minimum torque.

9. A method for regulating a torque output of a drive system, the drive system having a link voltage and at least partially powered by a DC voltage source having a voltage range, a source power, and a power range, the method comprising the steps of:

generating the torque output in response to a torque command;

determining if the link voltage exceeds the voltage range;

selecting a first torque limit when the link voltage exceeds the voltage range, the first torque limit based on the torque output and a first loss term;

determining if the source power exceeds a power range; and selecting a second torque limit when the source power exceeds the power range, the second torque limit based on the torque output and a second loss term.

10. A method according to claim 9, wherein said step of determining if the link voltage exceeds the voltage range comprises determining if the link voltage is less than a minimum voltage; and wherein the method further comprises:

determining an error between the link voltage and the minimum voltage;

applying a proportional gain to the error to produce a proportional term;

applying an integral gain and an integral function to the error to produce an integral term, the integral function having an initial value based on the torque output of the drive system and the first loss term;

summing the proportional term with the integral term to produce a first current;

removing the first loss term from the first current to produce a second current; and converting the second current to a torque to produce the first torque limit.

11. A method according to claim 9, wherein said step of determining if the link voltage exceeds the voltage range comprises determining if the link voltage is greater than a maximum voltage; and wherein the method further comprises:

determining an error between the link voltage and the maximum voltage;

applying a proportional gain to the error to produce a proportional term;

applying an integral gain and an integral function to the error to produce an integral term, the integral function having an initial value based on the torque output of the drive system and the first loss term;

summing the proportional term with the integral term to produce a first current;

removing the first loss term from the first current to produce a second current; and converting the second current to a torque to produce the first torque limit.

12. A method according to claim 9, wherein said step of determining if the source power exceeds the power range comprises determining if the source power is greater than a maximum discharge power; and wherein the method further comprises:

determining an error between the source power and the maximum discharge power;

applying a proportional gain to the error to produce a proportional term;

applying an integral gain and an integral function to the error to produce an integral term, the integral function having an initial value based on the torque output of the drive system and the second loss term;

summing the proportional term with the integral term to produce a first current;

removing the second loss term from the first current to produce a second current; and converting the second current to a torque to produce the second torque limit.

13. A method according to claim 9, wherein said step of determining if the source power exceeds the power range comprises determining if the source power is less than a maximum charge power; and wherein the method further comprises:

determining an error between the source power and the maximum charge power;

applying a proportional gain to the error to produce a proportional term;

applying an integral gain and an integral function to the error to produce an integral term, the integral function having an initial value based on the torque output of the drive system and the second loss term;

summing the proportional term with the integral term to produce a first current;

removing the second loss term from the first current to produce a second current; and converting the second current to a torque to produce the second torque limit.

14. A method according to claim 9, wherein the voltage range has minimum and maximum voltages; wherein the drive system has a powering mode and an available motoring torque during the powering mode and has a regenerating mode and an available regenerating torque during the regenerating mode; and wherein the method further comprises:

selecting the available motoring torque for the first torque limit when the link voltage is greater than the minimum voltage, the torque command is less than the available motoring torque, and the drive system is operating in the powering mode; and selecting the available regenerating torque for the first torque limit when the link voltage is less than the maximum voltage, the torque command is greater than the available regenerating torque, and the drive system is operating in the regenerating mode.

15. A method according to claim 9, wherein the power range has minimum and maximum powers; wherein the drive system has a powering mode and an available motoring torque during the powering mode and has a regenerating mode and an available regenerating torque during the regenerating mode; and wherein the method further comprises:

selecting the available motoring torque for the second torque limit when the source power is less than the maximum power, the torque command is less than the available motoring torque, and the drive system is operating in the powering mode; and selecting the available regenerating torque for the second torque limit when the source power is greater than the minimum power, the torque command is greater than the available regenerating torque, and the drive system is operating in the regenerating mode.

16. A control system for regulating a torque output produced by a drive system, the drive system having a link voltage and at least partially powered by a direct current (DC) voltage source having a voltage range, a source power, and a power range, the control system comprising:

a first controller configured to produce a torque command;

a second controller coupled to said first controller and configured to:

monitor the link voltage and the source power;

regulate the torque command to maintain the link voltage within the voltage range based on the torque output and a first loss term; and regulate the torque command to maintain the source power within the power range based on the torque output and a second loss term.

17. A control system according to claim 16, wherein the drive system has a voltage regulation bandwidth; wherein the DC voltage source has an equivalent series resistance; and wherein said second controller is further configured to receive an error if the link voltage exceeds the voltage, said second controller comprising:

a first module having a first gain and configured to apply said first gain to said error to produce a proportional term;

a second module having a second gain and configured to apply said second gain and an integral function to said error to produce an integral term, said second gain based on a ratio of said voltage regulation bandwidth to said equivalent series resistance, a ratio of said second gain to said first gain substantially greater than said voltage regulation bandwidth; and a summer coupled to said proportional gain module and said integral module and configured to sum said proportional term with said integral term.

18. A control system according to claim 17, wherein said second module comprises an integrator having an initial value based on the torque output and a copper loss term.

19. A control system according to claim 16, wherein the drive system has a power regulation bandwidth; and wherein said second controller is further configured to receive an error if the source power exceeds the power range, said second controller comprising:

a first module having a first gain and configured to apply said first gain to said error;

a second module having a second gain and configured to apply said second gain and an integral function to said error, said second gain based on said power regulation bandwidth, a ratio of said second gain to said first gain substantially greater than said power regulation bandwidth; and a summer coupled to said proportional gain module and said integral module and configured to sum said proportional term with said integral term.

20. A control system according to claim 16, wherein said second module comprises an integrator having an initial value based on the torque output and a copper loss term.

* * * * *